(12) United States Patent
Sonksen et al.

(10) Patent No.: US 8,065,454 B1
(45) Date of Patent: Nov. 22, 2011

(54) SYSTEM AND METHOD FOR MAPPING FUNCTIONS TO AND FROM NETWORK DEVICES USING CONFIGURATION COMPATIBLE WITH AN ADAPTER BY REMAPPING PLURALITY OF LOGICAL PORTS OF ADAPTER

(75) Inventors: Bradley S. Sonksen, Rancho Santa Margarita, CA (US); Vi Chau, Laguna Niguel, CA (US); Rajendra R. Gandhi, Laguna Niguel, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 114 days.

(21) Appl. No.: 12/544,658

(22) Filed: Aug. 20, 2009

(51) Int. Cl.
*G06F 13/00* (2006.01)
*G06F 3/00* (2006.01)
*G06F 12/00* (2006.01)

(52) U.S. Cl. .................. 710/72; 710/8; 710/10; 710/62; 710/63; 710/15; 710/313; 711/1; 711/6; 711/202

(58) Field of Classification Search .................... 710/12, 710/15–19, 72–74; 370/468
See application file for complete search history.

(56) References Cited

U.S. PATENT DOCUMENTS

| | | | |
|---|---|---|---|
| 6,091,727 A | 7/2000 | Han et al. | |
| 6,807,600 B2 * | 10/2004 | Bissessur et al. | 710/313 |
| 7,337,446 B2 | 2/2008 | Sankaranarayan et al. | |
| 7,546,386 B2 * | 6/2009 | Arndt et al. | 710/5 |
| 7,656,898 B2 * | 2/2010 | Ko | 370/468 |
| 7,966,616 B2 * | 6/2011 | Arndt et al. | 718/104 |
| 2003/0120914 A1 | 6/2003 | Axnix et al. | |
| 2005/0102682 A1 * | 5/2005 | Shah et al. | 719/321 |
| 2006/0195626 A1 | 8/2006 | Arndt et al. | |
| 2006/0195634 A1 | 8/2006 | Arndt et al. | |
| 2006/0282591 A1 | 12/2006 | Krithivas | |
| 2008/0163236 A1 * | 7/2008 | Arndt et al. | 718/104 |
| 2008/0270735 A1 | 10/2008 | Arndt et al. | |
| 2009/0106475 A1 * | 4/2009 | Arndt et al. | 710/311 |
| 2010/0208730 A1 * | 8/2010 | Henderson et al. | 370/389 |

* cited by examiner

*Primary Examiner* — Tammara Peyton
(74) *Attorney, Agent, or Firm* — Klein, O'Neill & Singh, LLP

(57) ABSTRACT

An adapter having a plurality of functions and a plurality of ports, in which the mapping between functions and ports is configurable. In certain embodiments, device memory can be programmed with a desired mapping scheme that overrides a default mapping scheme for the adapter. In certain embodiments, device memory can be reprogrammed with a different desired mapping to enable the adapter to dynamically respond to system conditions.

8 Claims, 6 Drawing Sheets

SYSTEM AND METHOD FOR MAPPING FUNCTIONS TO AND FROM NETWORK DEVICES USING CONFIGURATION COMPATIBLE WITH AN ADAPTER BY REMAPPING PLURALITY OF LOGICAL PORTS OF ADAPTER

BACKGROUND

The present invention relates to networks and network devices.

RELATED ART

Network adapters are typically used by computing systems/devices (for example, a server) to communicate with other network devices. Computing systems (may also be referred to as a host computing systems) may also use a host bus adapter or an adapter (jointly referred to as an "HBA") to store and access information in a storage area network (SAN). Continuous efforts are being made to converge the network adapter and HBA functionality into a single adapter, which may also be referred to as a converged network adapter (CNA).

SUMMARY

The various embodiments of the present system and methods for mapping functions have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description" one will understand how the features of the present embodiments provide advantages, which include the capability to configure a mapping scheme as desired to make an adapter compatible with other network devices, and the capability to reconfigure a mapping scheme to respond to changing network conditions.

One aspect of the present system and methods for mapping functions includes the realization that hardwiring each function to one of the logical ports can create compatibility problems between the host system and a network device. Another aspect of the present system and methods for mapping functions includes the realization that hardwiring each function to one of the logical ports hamstrings the ability of the adapter to respond to changing network conditions.

One embodiment of the present methods for mapping functions comprises configuring a multi-function network adapter. The network adapter includes a plurality of functions and a plurality of logical ports. The method comprises initializing the network adapter. The method further comprises downloading a pre-load table stored in a memory of the adapter to programmable registers of the adapter. The pre-load table includes a non-default mapping of the functions to the logical ports. The method further comprises programming the registers with the non-default mapping of the functions to the logical ports. The method further comprises passing the non-default mapping configuration from the programmable registers to routing logic of the adapter.

One embodiment of the present system for mapping functions comprises a multi-function network adapter having configurable mapping of functions to ports. The adapter comprises a plurality of functions including control/status registers and user-defined logic associated with the registers. The functions are configured to facilitate communication between a host system and the network adapter. The adapter further comprises a plurality of physical ports configured to send and receive network information. The adapter further comprises a plurality of logical ports configured to send and receive network information via the physical ports. The adapter further comprises routing logic configured to map each function to one of the logical ports. The adapter further comprises programmable memory programmed with a mapping scheme that maps the functions to the logical ports. The mapping scheme is configurable according to a program stored in the programmable memory so that the functions can be mapped to the logical ports in a desired configuration so that the network adapter is compatible with other network devices.

Another embodiment of the present system for mapping functions comprises a multi-function network adapter having reconfigurable mapping of functions to ports. The adapter comprises a plurality of functions including control/status registers and user-defined logic associated with the registers. The functions are configured to facilitate communication between a host system and the network adapter. The adapter further comprises a plurality of physical ports configured to send and receive network information. The adapter further comprises a plurality of logical ports configured to send and receive network information via the physical ports. The adapter further comprises routing logic configured to map each function to one of the logical ports. The mapping between the functions and the logical ports is reconfigurable so that at least a first one of the functions can be initially mapped to a first one of the logical ports and later reconfigured to be mapped to a second one of the logical ports.

BRIEF DESCRIPTION OF THE DRAWINGS

The various embodiments of the present system and methods for mapping functions now will be discussed in detail with an emphasis on highlighting the advantageous features. These embodiments depict the novel and non-obvious network adapter shown in the accompanying drawings, which are for illustrative purposes only. These drawings include the following figures, in which like numerals indicate like parts.

DETAILED DESCRIPTION

Figure 1:
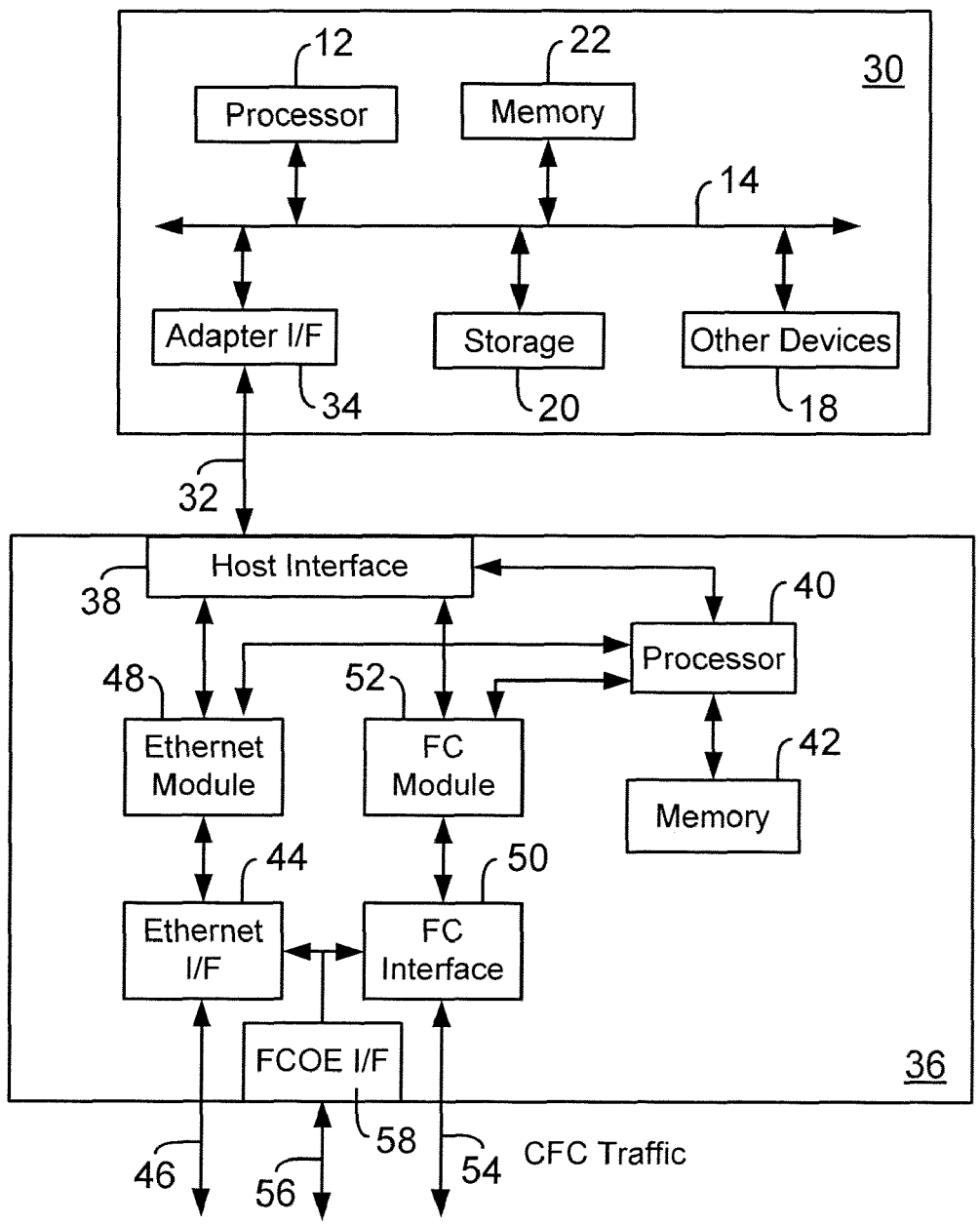
FIG. 1 is a functional block diagram of a system having a converged adapter coupled to a host system, according to one embodiment.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

FIG. 1 is a block diagram of a system 10 where a computing system 30 (may also be referred to as "host system 30") coupled to an adapter 36 interfaces with network and storage devices (not shown). The host system 30 may include a processor 12, also known as a central processing unit (CPU). The processor 12 executes computer-executable process steps and interfaces with a computer bus 14. An adapter interface 34 facilitates the ability of the host system 30 to interface with the adapter 34, as described below. The host system 30 also includes other devices and interfaces 18, which may include a display device interface, a keyboard interface, a pointing device interface, etc.

The host system 30 may further includes a storage device 20, which may be for example a hard disk, a CD-ROM, a non-volatile memory device (flash or memory stick) or any other device. Storage 20 may store operating system program files, application program files, and other files. Some of these files are stored on storage 20 using an installation program. For example, the processor 12 may execute computer-executable process steps of an installation program so that the processor 12 can properly execute the application program.

Memory 22 also interfaces to the computer bus 14 to provide the processor 12 with access to memory storage. Memory 22 may include random access main memory (RAM) When executing stored computer-executable process steps from storage 20, the processor 12 may store and execute the process steps out of RAM.

Read only memory (not shown) may also be used to store invariant instruction sequences, such as start-up instruction sequences or basic input/output operating system (BIOS) sequences for operation of a keyboard (not shown).

With continued reference to FIG. 1, the adapter 36 is coupled to the host system 30 via link 32 and adapter interface 34. Adapter 36 may be configured to handle both network and storage traffic. Various network and storage protocols may be used to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 gigabit (Gb). The description of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage protocol used to access storage systems is Fibre Channel. Fibre channel is a set of American National Standards Institute (ANSI) standards that provide a serial transmission protocol for storage and network protocols such as HIPPI, SCSI, IP, ATM and others. Fibre channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port.

A new and upcoming standard, called Fibre Channel Over Ethernet (FCOE) has been developed to handle both Ethernet and Fibre Channel traffic in a SAN. This functionality would allow Fibre Channel to leverage 10 Gigabit Ethernet networks while preserving the Fibre Channel protocol. The adapter 36 shown in FIG. 1 may be configured to operate as a FCOE adapter and may be referred to as FCOE adapter 36. QLogic Corporation, the assignee of the present application, provides one such adapter.

The FCOE adapter 36 interfaces with the host system 30 via a host interface 38. In one embodiment, the host interface 38 may be a PCI Express interface coupled to a PCI Express link 32. The FCOE adapter 36 may also include a processor 40 that executes firmware instructions out of memory 42 to control overall FCOE adapter 36 operations.

The FCOE adapter 36 includes an Ethernet interface 44 that may transmit and receive network packets via a link 46 to a network (not shown). Ethernet interface 44 may include memory buffers to temporarily store information received from other network devices and transmitted to other network devices. The FCOE adapter 36 also includes an Ethernet Module 48 that interfaces with the Ethernet interface 44 and the host system 30 to process packets in the receive path (coming in from the network) and the transmit path (going out to the network).

The FCOE adapter 36 may also include a Fibre Channel (FC) interface 50 that receives FC traffic from an FC storage area network (SAN) and sends information out to FC storage devices (not shown). FC interface 44 may include memory buffers to temporarily store information received from FC storage devices and transmitted by FCOE adapter 36 to FC storage devices. An FC module 52 interfaces with both the FC interface 50 and the host system 30 to send and receive FC frames.

In FIG. 1, although separate links 46, 54 are shown for network and storage related traffic, a single link 56 may be used to route network/storage packets (e.g. FCOE packets). FCOE packets are initially received by the FCOE I/F 58 and then routed to the Ethernet I/F 44 or the FC Interface 50.

FCOE adapter 36 may include a plurality of physical ports. The ports may be used as network ports, for example, as Ethernet ports. FCOE adapter 36 further includes a plurality of logical ports, sometimes referred to as data transfer engines (DTEs). The logical ports may be configured to operate as network interface controllers (NICs) for sending and receiving network information via the physical ports. The logical ports may also be configured to operate as storage ports for sending and receiving data using a storage protocol, such as FC.

The host system 30 communicates with a computer network through the logical ports and the physical ports. To connect with one of the ports, the host computing system typically communicates through a function. A function is a logical device residing at FCOE adapter 36. A function consists of a set of standardized control/status registers, which a software driver in the host system uses to communicate with FCOE adapter 36, and user-defined logic (control path, data path, RISC processors, Ethernet and/or FC link interface, etc.) that is associated with those registers. FCOE adapter 36 resources are carved up into multiple sub-devices, also known as functions.

In the current state of the art, each function is typically hardwired to one of the logical ports through a multiplexer (MUX), or routing logic. For example, a typical FCOE adapter 36 may include four functions, 0-3, and four DTEs, A-D. Function 0 is hardwired to DTE A, function 1 is hardwired to DTE B, function 2 is hardwired to DTE C and function 3 is hardwired to DTE D.

The hardwired approach is undesirable because it requires numerous connections and is inflexible. The embodiments described herein provide a flexible solution where different functions and ports can be programmed such that the need for dedicated function/port relationship is reduced.

Figure 2:
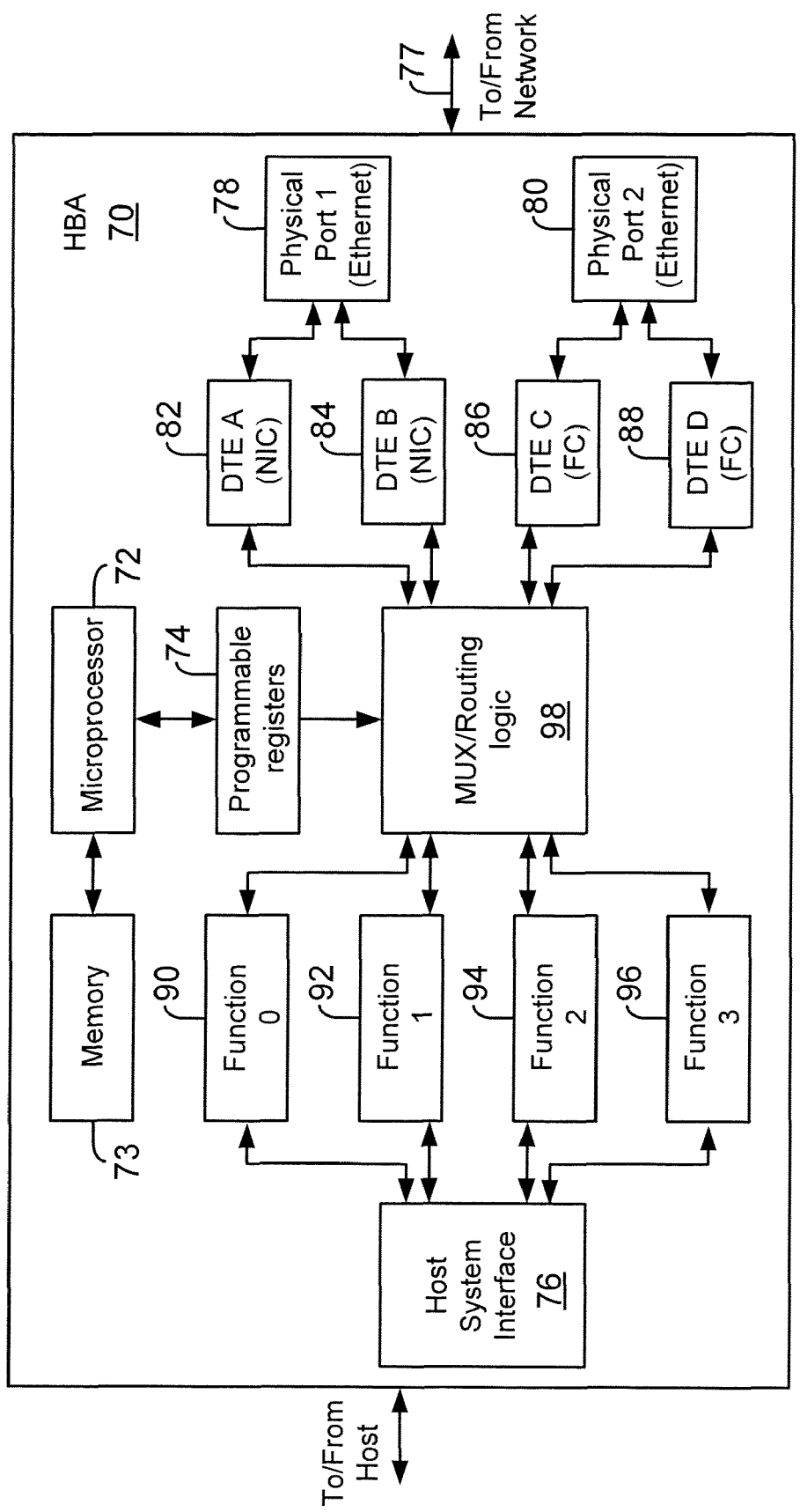
FIG. 2 is a functional block diagram of an adapter used in the system of FIG. 1.

FIG. 2 provides a system-level block diagram of one embodiment of the present system for mapping functions. The system includes an adapter 70 that may be similar to the adapter 36 described above with respect to FIG. 1.

The adapter 70 may include a processor 72 that executes firmware instructions from memory 73 to control overall adapter operations. In one embodiment, processor 72 may be a reduced instruction set computer (RISC). The processor 72 has access to programmable registers 74 that are described below.

Adapter 70 interfaces with a host computing system, such as the host system 30, through a host system interface 76. The host system interface 76 may be, for example, a Peripheral Component Interconnect (PCI) Express interface. The host system 30 sends commands and data via the host system interface 76, and the Adapter 70 sends network information to the host system 30 via the host system interface 76.

In certain embodiments, the Adapter 70 may operate as a network interface controller (NIC) as well as a standard adapter interfacing with networked storage devices. To achieve this functionality, the adapter 70 may, for example, leverage the FCOE protocol.

The adapter 70 includes at least one physical port to send and receive network information via a network link 77. As used herein the term physical port describes a physical hardware interface between a network and an adapter. In the illustrated embodiment, the adapter 70 may include physical port 1 (78) and physical port 2 (80). Those of ordinary skill in the art will appreciate that the adapter 70 may include any number of physical ports. Ports 78, 80 may be, for example, Ethernet ports, or any other type of ports. Each of the physical ports 78, 80 is a physical hardware interface between the adapter 70 and a network (not shown) that allows the adapter 70 to connect to the network as well as to networked storage devices (not shown).

The adapter 70 may further include at least one logical port, which may also be referred to as a data transfer engine (DTE). In the illustrated embodiment, the adapter 70 may include four logical ports 82, 84, 86, 88, labeled as DTE A, DTE B, DTE C and DTE D. Those of ordinary skill in the art will appreciate that the adapter 70 may include any number of logical ports. The logical ports 82, 84, 86, 88 may be configured to operate as NICs, for example, for sending and receiving network information via one or both of the physical ports 78, 80. The logical ports 82, 84, 86, 88 may also be configured for sending and receiving storage data using a storage protocol, such as Fibre Channel (FC). As used herein, the term storage port describes a port that is configured for sending and receiving data using a storage protocol.

In the present embodiments, the logical ports 82, 84, 86, 88 may be configured with any combination of NICs and storage ports. For example, as illustrated in FIG. 3 two of the logical ports 82, 84 may be configured to operate as standard NICs, and two of the logical ports 86, 88 may be configured to operate as FC storage ports.

A host system, such as the host system 30 illustrated in FIG. 1, communicates with a computer network (not shown) through the adapter 70 using the logical ports 82, 84, 86, 88 and the physical ports 78, 80.

Figure 3:
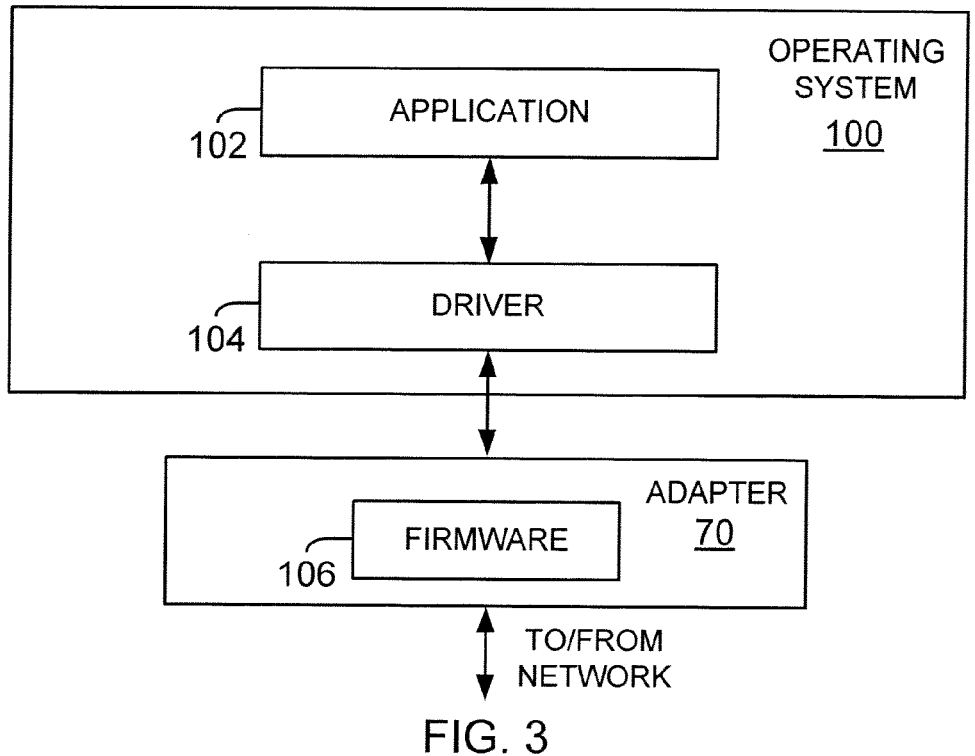
FIG. 3 is a functional block diagram of a software architecture used in the system of FIG. 1.

FIG. 3 shows a software architecture used for handling both network and storage traffic, according to one embodiment. Host system 30 may execute an operating system 100 that is responsible for the management and coordination of activities and the sharing of the resources of the host system 30. An application layer 102 may issue network and storage related requests. The requests may be to read and write information in networked storage devices (not shown) or simply to communicate with other network devices (not shown). A driver 104 that communicates with adapter firmware 106 may handle application 102 requests. Firmware 106 is typically used to control overall adapter 70 functionality. The adapter functions are described below.

Figure 4:
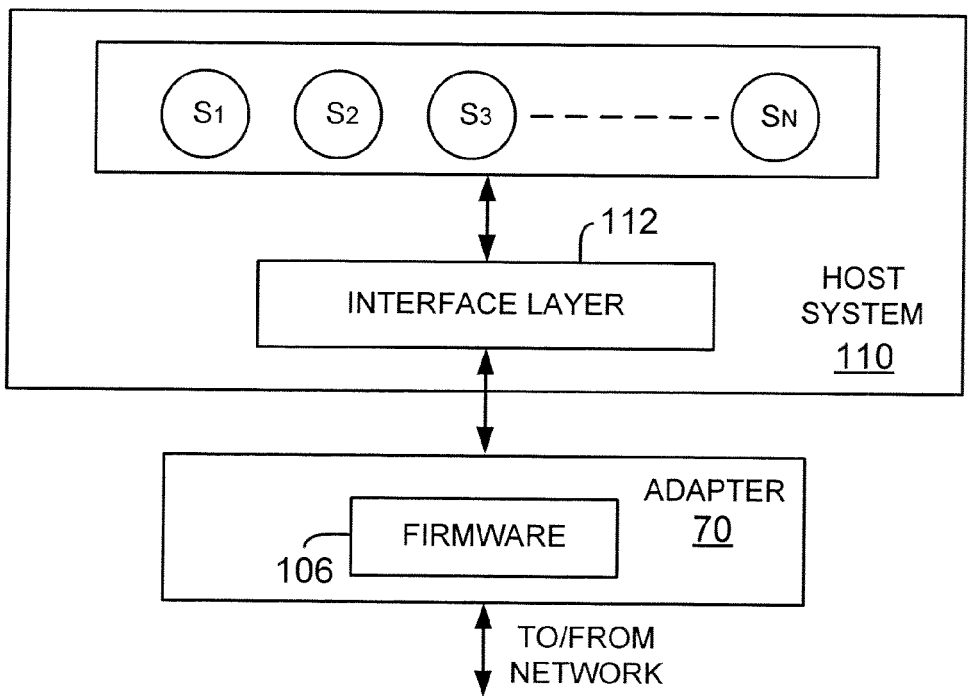
FIG. 4 shows a software architecture for a host system coupled to a network adapter.

FIG. 4 illustrates another example of a host system 110 interfacing with a network through the adapter 70 in a virtual machine environment. In this embodiment, the host system 110 may execute a plurality of virtual operating systems, shown as a plurality of system images $SI_1$, $SI_2$, $SI_3$ ... $SI_N$. The host system 110 (similar to host system 30) executes an interface layer, for example, a hypervisor 112 layer. A hypervisor, also called a virtual machine monitor (VMM), is computer software/hardware platform virtualization software that allows multiple operating systems to run on the host system 110 concurrently. For example, software available from VMware, Inc. provides a completely virtualized set of hardware to guest operating systems. The hypervisor 112 communicates with the network through one or more of the functions of the adapter 70.

With reference to FIG. 2, in the illustrated embodiment the adapter 70 may include functions 90, 92, 94, 96, labeled as function 0 (90), function 1 (92), function 2 (94) and function 3 (96). Those of ordinary skill in the art will appreciate that the adapter 70 may include any number of functions. The functions 90, 92, 94, 96 may be, for example, PCI Express functions (referred to herein as PCI functions), or any other type of functions. A PCI function is a logical device (hardware) for the adapter 70. A PCI function may include a set of standardized PCI control/status registers, which a driver 104 uses to communicate with the adapter 70, and user-defined logic (control path, data path, RISC processors, Ethernet and/or FC link interface, etc.) that is associated with those registers. A PCI function may be a subset of a PCI Express device. In the context of the present embodiments, a PCI Express device is the same thing as an entire adapter, for example. Although the terms function and PCI function are used interchangeably herein, those of ordinary skill in the art will appreciate that the present embodiments may include any type of functions in addition to or instead of PCI functions.

In contrast to the prior art in which each function is hardwired to one of the logical ports, the present embodiments enable the mapping of the functions 90, 92, 94, 96 to the logical ports 82, 84, 86, 88 to be configurable. In certain embodiments, any function 90, 92, 94, 96 can be mapped to any logical port 82, 84, 86, 88. For example, in one embodiment device memory 73 can be programmed with a desired non-default mapping scheme when the Adapter 70 is manufactured. When Adapter 70 IS initialized, the processor 72 reads a pre-load table including the non-default mapping scheme out of memory 73 and stores it in programmable registers 74 of the adapter 70. The mapping configuration is then passed from the programmable registers 74 to a multiplexer (MUX) 98, also referred to as routing logic. The routing logic 98 controls communication between the functions 90, 92, 94, 96 and the logical ports 82, 84, 86, 88 according to the non-default mapping scheme that was initially programmed into device memory 73 when the Adapter 70 was manufactured. The non-default mapping scheme thus overrides a default mapping scheme that may be built into the adapter 70 when it is manufactured.

One advantage of the embodiment described above is that the mapping of functions to logical ports can be configured according to a desired non-default scheme in order to make the Adapter 70 compatible with other network devices. For example, a hardwired CNA may be compatible with devices in a first network, but not with devices in a second network. To meet the demands of all customers, then, a CNA manufacturer would have to produce differently hardwired CNAs to be compatible with different types of networks. Producing differently hardwired CNAs can raise manufacturing costs. With the present configurable Adapter 70, a single type of Adapter 70 can be manufactured, and programmed as necessary with a mapping scheme that is compatible with the network in which the Adapter 70 will be installed. This configurability reduces the cost of producing CNAs that are compatible with multiple types of networks. In certain embodiments, the desired non-default mapping scheme can be programmed into device memory 73 once, when the Adapter 70 is manufactured, and then read out of memory 73 each time the Adapter 70 is initialized.

In another embodiment, the mapping of functions to logical ports can be reconfigured during normal operation, after power-on initialization has already been completed. For example, in a first configuration for the Adapter 70, function 0 (90) is mapped to DTE A (82), function 1 (92) is mapped to DTE B (84), function 2 (94) is mapped to DTE C (86) and function 3 (96) is mapped to DTE D (88). If DTE A (82) is inactive, there is no path between the host system 30 and the network through function 0 (90). This configuration may make certain network devices incompatible with the adapter 70, because those network devices communicate with the host only through function 0 (90).

In certain embodiments, if DTE A (82) is inactive the mapping between the functions 90, 92, 94, 96 and the logical ports 82, 84, 86, 88 can be reconfigured so that, for example, function 0 (90) is mapped to DTE B (84), function 1 (92) is mapped to DTE C (86), function 2 (94) is mapped to DTE D (88) and function 3 (96) is unmapped. Now only the first three functions 90, 92, 94 are mapped, and compatibility issues are eliminated. The reconfiguration may be accomplished by reprogramming device memory 73 with another pre-load table including the desired new configuration. The reprogramming may be performed, for example, by the end user of the Adapter 70. After the memory 73, is reprogrammed, the new mapping scheme can be implemented by reinitializing the adapter 70. During reinitialization, the new mapping scheme is read out of device memory 73, stored in the programmable registers 74, and passed on to the routing logic 98 in a manner similar to that described above for the foregoing embodiment. Those of ordinary skill in the art will appreciate that the present embodiments may enable the mapping between the functions and the logical ports to be reconfigured into any desired configuration, at any time, and for any reason. The example described above regarding the inactivity of DTE A (82) is just one possible motivation among many for initiating a reconfiguration.

The foregoing description refers to reprogramming the device memory 73. However, those of ordinary skill in the art will appreciate that the capability to program the device memory 73 does not depend upon whether the device memory 73 of the adapter 70 was previously programmed. For example, the Adapter 70 may be manufactured with a default mapping and without programming the memory 73 with a non-default mapping. The Adapter 70 would then operate according to the default mapping. If it is desired to reconfigure the mapping, the memory 73 may be programmed for the first time with a non-default mapping that overrides the default mapping when the adapter 70 is reinitialized.

Figure 5:
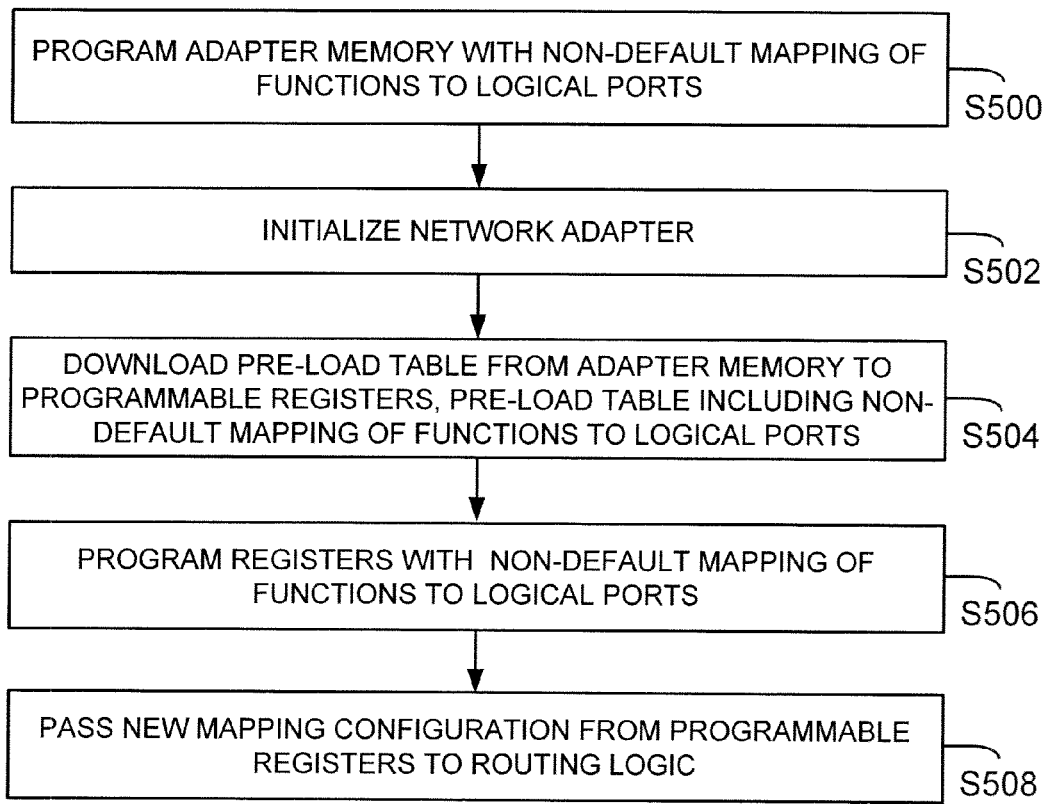
FIG. 5 is a flow chart illustrating one embodiment of the present methods for mapping functions to ports.

FIG. 5 is a flowchart illustrating one embodiment of the present methods for reconfiguring an adapter. At block S500, the process begins when adapter memory 73 is programmed with a non-default mapping of functions to logical ports. This step may be performed when the Adapter 70 is manufactured. At block S502, the network adapter is initialized. During initialization, at block S504, a pre-load table stored in the adapter memory 73 is downloaded to the programmable registers 74. The pre-load table includes the non-default mapping of functions to logical ports. At block S506, the registers 74 are programmed with the non-default mapping of functions to logical ports. At block S508, the non-default mapping configuration is passed from the programmable registers 74 to the routing logic 98.

Figure 6:
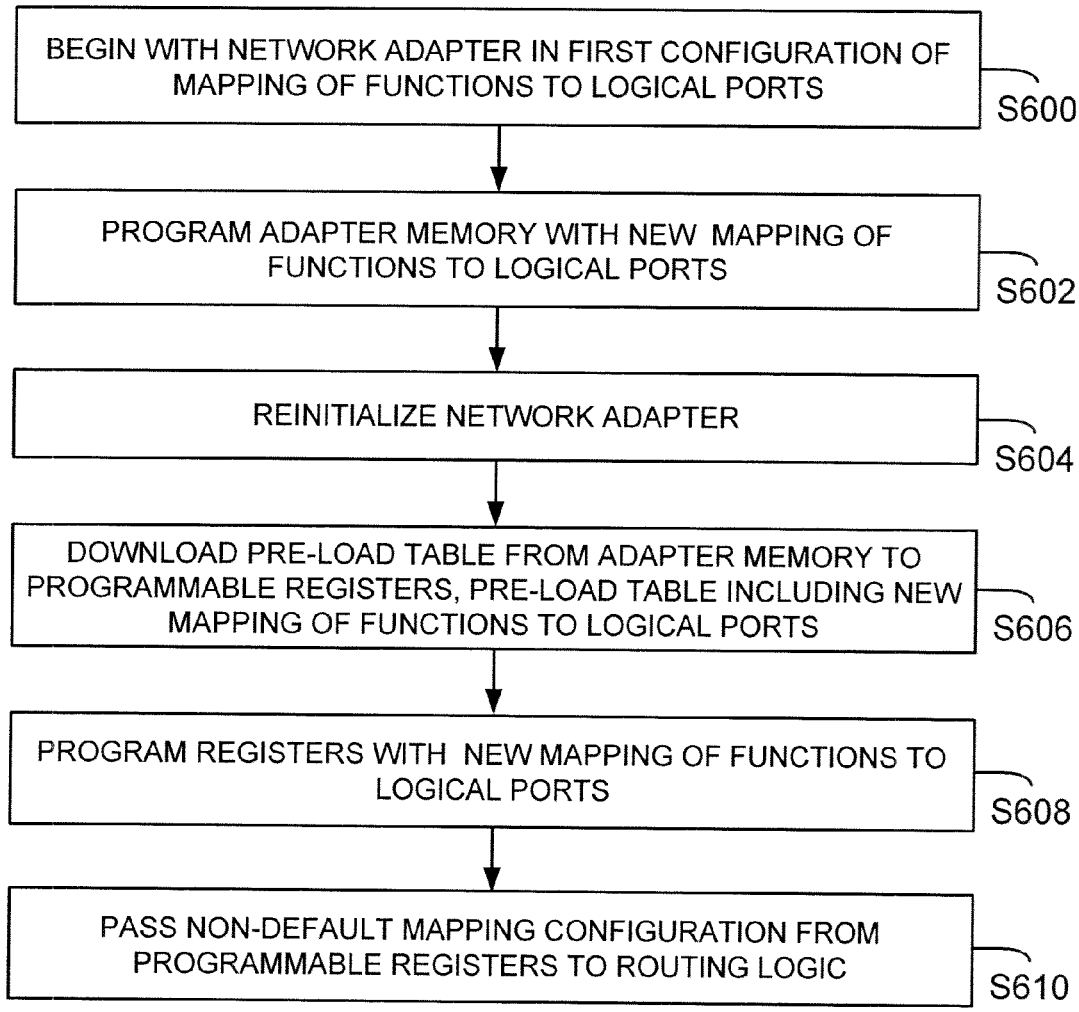
FIG. 6 is a flow chart illustrating another embodiment of the present methods for mapping functions to ports.

FIG. 6 is a flowchart illustrating another embodiment of the present methods for reconfiguring an adapter. At block S600, the adapter is in an initial state in which one or more functions is mapped to one or more logical ports. For example, with reference to FIG. 3, in the initial state function 0 (90) is mapped to DTE A (82), function 1 (92) is mapped to DTE B (84), function 2 (94) is mapped to DTE C (86) and function 3 (96) is mapped to DTE D (88). At block S602, the adapter memory is reprogrammed with another pre-load table including a new mapping of functions to logical ports. At block S604, the network adapter is reinitialized.

At block S606, the new pre-load table is downloaded from the adapter memory to the programmable registers. The new pre-load table includes the new mapping of functions to logical ports. The download may happen by default when the adapter is reinitialized, if the memory contains a pre-load table. If the memory does not contain a pre-load table, the adapter may default to the previous mapping.

At block S608, the programmable registers are programmed with the new mapping of functions to logical ports. For example, with reference to FIG. 3, the new mapping may comprise function 0 (90) mapped to DTE B (84), function 1 (92) mapped to DTE C (86), function 2 (94) mapped to DTE D (88) and function 3 (96) unmapped. At block S610, the new mapping configuration is passed from the programmable registers 74 to the routing logic 98.

In the present embodiments, mapping the functions 90, 92, 94, 96 to the logical ports 82, 84, 86, 88 may involve programming at least two settings per DTE. The settings may be, for example, DTE_Junction_number and DTE_function_enable. DTE_function_number assigns a DTE 82, 84, 86, 88 to a specific function 90, 92, 94, 96. DTE_Junction_enable enables the PCI function number specified by DTE_function_number.

Figure 7:
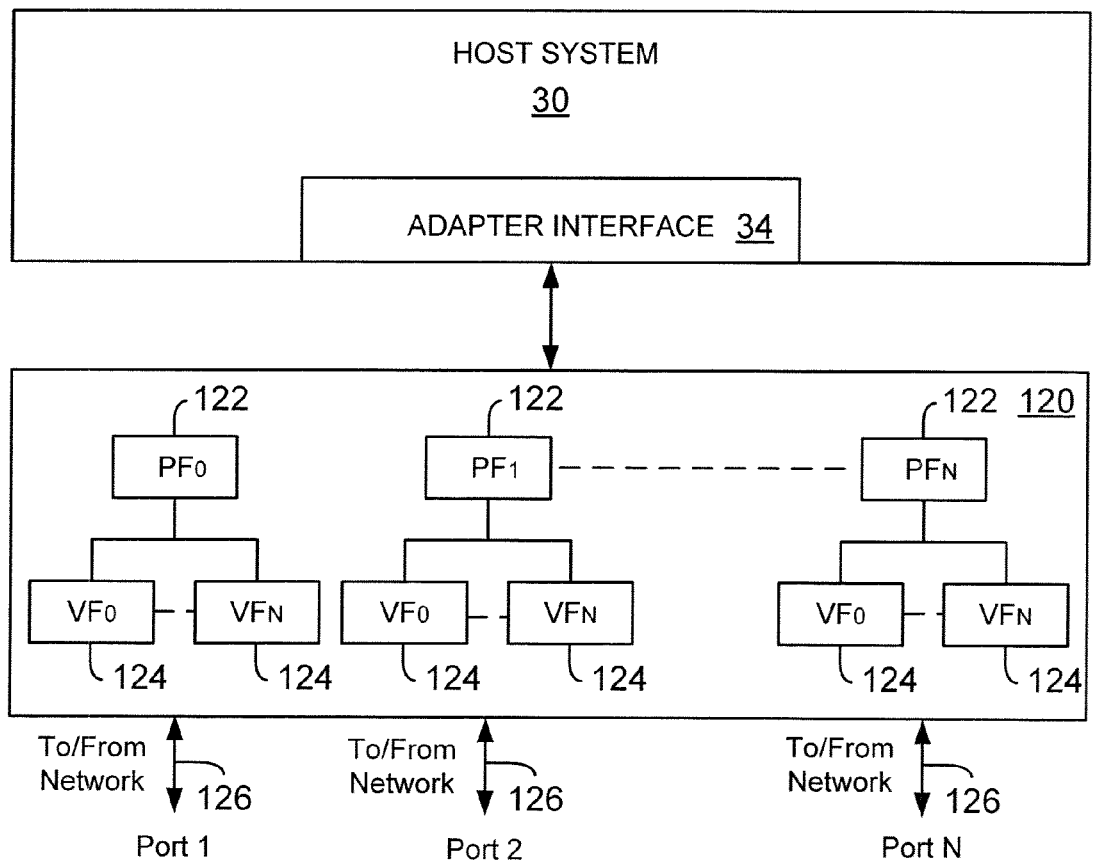
FIG. 7 is a functional block diagram of another embodiment of the present system for mapping functions.

FIG. 7 provides a system-level block diagram of a system including another embodiment of the present network adapter having configurable mapping of functions to ports. The system of FIG. 7 includes a host computing system, which may be, for example, the host system 30 described above. The host system 30 includes an adapter interface 34, which facilitates communication between the host system 30 and the adapter 120. The adapter 120 includes at least one physical function 122. As used herein, the term physical function (PF) describes a software interface between a dedicated hardware component and a driver (software). N PFs 122 are shown, and those of ordinary skill in the art will appreciate that N may be equal to any number. Each of the PFs 122 includes at least one virtual function 124. As used herein, the term virtual function 124 (VF) describes a software interface between a shared hardware component and a driver (software). N VFs 124 are shown associated with each PF 122, and those of ordinary skill in the art will appreciate that N may be equal to any number. The adapter 120 further includes at least one physical and logical port 126. N ports 126 are shown, and those of ordinary skill in the art will appreciate that N may be equal to any number. While not shown in FIG. 7, the adapter 120 further includes memory, a processor, programmable registers, and routing logic. The functions of these components are similar to that described above with respect to FIG. 2.

In the adapter 120 shown in FIG. 7, the PFs 122 can be mapped to the ports 126 according to the embodiments described above with respect to FIGS. 5 and 6. In a first example configuration of the adapter 120 of FIG. 7, $PF_0$ is mapped to Port 1, $PF_1$ is mapped to Port 2 and $PF_2$ is mapped to Port 3. According to certain embodiments, the mapping can be reconfigured so that, for example, $PF_0$ is mapped to Port 2, $PF_1$ is mapped to Port 3 and $PF_2$ is mapped to Port 4. In certain embodiments, the reconfiguration may map any PF 122 to any port 126. Those of ordinary skill in the art will appreciate that the VFs 124 are dedicated to their respective PFs 122, so that when a PF 122 is mapped to a port 126 its associated VFs 124 are mapped to the same port 126.

The above description presents the best mode contemplated for carrying out the present network adapter, and of the manner and process of making and using it, in such full, clear, concise, and exact terms as to enable any person skilled in the art to which it pertains to make and use this network adapter. This network adapter is, however, susceptible to modifications and alternate constructions from that discussed above that are fully equivalent. Consequently, this network adapter is not limited to the particular embodiments disclosed. On the contrary, this network adapter covers all modifications and alternate constructions coming within the spirit and scope of the network adapter as generally expressed by the following claims, which particularly point out and distinctly claim the subject matter of the network adapter.

What is claimed is:

1. A multi-function adapter having configurable mapping of functions to ports, comprising:
   a plurality of functions including control/status registers and user-defined logic associated with the registers, the functions being configured to facilitate communication between a host system and the adapter;
   a plurality of physical ports configured to send and receive network information;
   a plurality of logical ports configured to send and receive network information via the physical ports;
   routing logic configured to map each function to one of the logical ports; and
   programmable memory programmed with a mapping scheme that maps the functions to the logical ports;
   wherein the mapping scheme is configurable according to a program stored in the programmable memory so that the functions can be mapped to the logical ports in a desired configuration so that the adapter is compatible with other network devices.

2. The adapter of claim 1, further comprising programmable registers for storing the mapping scheme and passing the mapping scheme to the routing logic.

3. The adapter of claim 1, wherein the functions are physical functions, and further comprising a plurality of virtual functions associated with at least one of the physical functions.

4. The adapter of claim 3, wherein according to the mapping scheme each virtual function is mapped to the same logical port as the physical function with which it is associated.

5. A multi-function adapter having reconfigurable mapping of functions to ports, comprising:
   a plurality of functions including control/status registers and user-defined logic associated with the registers, the functions being configured to facilitate communication between a host system and the adapter;
   a plurality of physical ports configured to send and receive network information;
   a plurality of logical ports configured to send and receive network information via the physical ports; and
   routing logic configured to map each function to one of the logical ports;
   wherein the mapping between the functions and the logical ports is reconfigurable so that at least a first one of the functions can be initially mapped to a first one of the logical ports and later reconfigured to be mapped to a second one of the logical ports.

6. The adapter of claim 5, further comprising programmable registers for storing the mapping scheme and passing the mapping scheme to the routing logic.

7. The adapter of claim 5, wherein the functions are physical functions, and further comprising a plurality of virtual functions associated with at least one of the physical functions.

8. The adapter of claim 7, wherein according to the mapping scheme each virtual function is mapped to the same logical port as the physical function with which it is associated.

* * * * *

UNITED STATES PATENT AND TRADEMARK OFFICE
CERTIFICATE OF CORRECTION

PATENT NO. : 8,065,454 B1  
APPLICATION NO. : 12/544658  
DATED : November 22, 2011  
INVENTOR(S) : Sonksen et al.

Page 1 of 1

It is certified that error appears in the above-identified patent and that said Letters Patent is hereby corrected as shown below:

In column 9, line 16, delete "DTE_Junction" and insert -- DTE_function --, therefor.

In column 9, line 18, delete "DTE_Junction" and insert -- DTE_function --, therefor.

Signed and Sealed this
Seventh Day of February, 2012

David J. Kappos
*Director of the United States Patent and Trademark Office*